United States Patent
Kristensen (10) Patent No.: US 8,532,264 B2
(45) Date of Patent: Sep. 10, 2013

(54) ID-PROGRAMMING BY SELT/MELT

(75) Inventor: Marinus Kristensen, Struer (DK)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 0 days.

(21) Appl. No.: 13/511,239

(22) PCT Filed: Nov. 24, 2009

(86) PCT No.: PCT/SE2009/051329
§ 371 (c)(1),
(2), (4) Date: May 22, 2012

(87) PCT Pub. No.: WO2011/065872
PCT Pub. Date: Jun. 3, 2011

(65) Prior Publication Data
US 2012/0230475 A1    Sep. 13, 2012

(51) Int. Cl.
*H04M 1/24*     (2006.01)
*H04M 3/08*     (2006.01)
*H04M 3/22*     (2006.01)

(52) U.S. Cl.
USPC ... 379/25; 379/26.01; 379/29.02; 379/413.02

(58) Field of Classification Search
USPC .......... 379/1.01, 9.04, 9.06, 14, 10.01, 15.01, 379/22, 22.04, 22.05, 25, 26.01, 29.02, 29.05, 379/32.01, 413.02
See application file for complete search history.

(56) References Cited

U.S. PATENT DOCUMENTS

| 4,914,689 | A | 4/1990 | Quade et al. | |
| 5,187,733 | A | 2/1993 | Beffel et al. | |
| 7,984,192 | B2* | 7/2011 | Burr et al. | 709/250 |
| 8,175,008 | B1* | 5/2012 | Rustagi et al. | 370/255 |
| 2006/0075123 | A1* | 4/2006 | Burr et al. | 709/228 |
| 2012/0189020 | A1* | 7/2012 | Rustagi et al. | 370/419 |

* cited by examiner

Primary Examiner — Binh Tieu
(74) Attorney, Agent, or Firm — Rothwell, Figg, Ernst & Manbeck, P.C.

(57) ABSTRACT

The present invention relates to a method and a ID-programming tool (30) for assigning a unique network entity identity number to a network entity (10). The network entity (10) is adapted to perform said method. The network entity (10) comprises a number of subscriber lines (12) and the network entity is adapted to perform at least one line condition test on said subscriber lines at a predefined occasion. Said subscriber lines are encoded to comprise a unique network entity identity number information by means of the ID-programming tool (30). Further, decoding means (42) is adapted to decode the network entity identity number information resulting from said test to gain said network entity identity number. Said network entity identity number is stored in a storage device (20) on the network entity (10).

18 Claims, 7 Drawing Sheets

ID-PROGRAMMING BY SELT/MELT

CROSS-REFERENCE TO RELATED APPLICATION

This application is a 35 U.S.C. §371 National Phase Entry Application from PCT/SE2009/051329, filed Nov. 24, 2009, and designating the United States.

TECHNICAL FIELD

The present invention relates to a method and a ID-programming tool for assigning a unique network entity identity number to a network entity. Further, a network entity for performing said method is described.

BACKGROUND

A network or system comprises a plurality of entities, such as network nodes, electronic equipment, electronic elements or components, units, etc. During IP-network design, there will frequently be a need to assign a unique network entity identity number to some of the entities. If an entity has to be replaced, the new entity has to be provided with the unique network entity identity (ID) number. Said number is preferably provided by the network operator.

The most common solution to assign network entities a unique number is the use of a dipswitch, e.g. an eight bit dipswitch containing eight single switches, one for each bit. Each single switch could be set manually in either of two positions for indicating off-position, even denoted "0" (zero), or on-position, denoted as "1" (One). Said known solution is described in the following detailed description with reference to FIG. 1.

During entity restart, e.g. after power-up, the entity-processor reads the on/off position of each individual switch of the dipswitch and use this binary information as its entity network identity number.

Known problems, when dipswitches and other solutions are used for assigning a unique network entity ID number to an entity, are:
  Limited space on a Printed Circuit Board (PCB). A dipswitch and corresponding components are relatively big components which will reduce the possibility to design really high density products. Specially in high density products this will also increase the Unit cost.
  Required external access. To be able to set a dipswitch it is necessary to provide an opening in the unit casing for the operators, service and installation personal. The gating will often require a more complex mechanic production process and increase the Unit cost.
  Electro-Static Discharge (ESD) protection of the entity is needed when a person access the interior of the external casing of the entity for setting the entity ID number. ESD protection circuitry requires both components and PCB-area. Especially the protection components will increase the Unit cost.

Today this requirement concerning assigning a unique number to each entity also apply even for relatively small entities like a 12 or 24 subscriber line IP-units. These units are high volume products and very cost sensitive.

SUMMARY

Therefore, the objective of the present invention is to find a solution to the above listed problems.

Said object is achieved by the present invention, which provides a method and a device for assigning a unique network entity ID number to an entity.

The basic concept is to make network-entity ID-programming possible for an network entity, e.g. subscriber line unit, by reading the subscriber line conditions during power-up, by means of the built-in SELT and MELT functions, and make a decoding and decryption of the subscriber conditions read and processed as ID-update starting information and ID-number information.

The ID-update starting information enables or disables the further ID-number assignment, and the ID-number information represents the assigned network-entity-number. The ID-number assignment, even here denoted as ID-programming, of the network-entity is performed during power-up of the entity. The desired ID-number and the ID-programming enabling code, hereafter called update starting information, are added to the unit's subscriber line connector by temporarily short circuiting of some of the connector's contact means, e.g. pins, and by leaving other contact means opened.

The present invention relates to a method and a ID-programming tool for assigning a unique network entity identity number to a network entity. The network entity is adapted to perform said method. The network entity comprises a number of subscriber lines and the network entity is adapted to perform at least one line condition test on said subscriber lines at a predefined occasion. Said subscriber lines are encoded to comprise a unique network entity identity number information by means of the ID-programming tool. Further, decoding means is adapted to decode the network entity identity number information resulting from said test to gain said network entity identity number. Said network entity identity number is stored in a storage device on the network entity.

The ideas in this invention support network-entity-ID-programming of both xDSL IP-units and POTS IP-units.

According to one aspect of the present invention, a method for assigning a unique network entity identity number to a network entity comprising a number of subscriber lines of the network is provided. The network entity is adapted to perform at least one line condition test on said subscriber lines at a predefined occasion. First a predetermined line condition test on at least a number of said subscriber lines being encoded to comprise an unique network entity identity number information is performed. In a decoding step, said network entity identity number information resulting from said test to gain said network entity identity number is performed. Thereafter, said network entity identity number is stored in a storage device on the network entity.

The invented method is performed at a predefined occasion, e.g. power-up of the entity, software restart (software connected or related to the entity), by pushing a start button, etc.

According to yet another aspect of the present invention, a network entity is provided. Said network entity is adapted for assignment of a unique network entity identity number, said entity comprising an entity data processor and a number of subscriber lines of the network. The network entity comprises means for performing at least one predetermined line condition test on at least a number of said subscriber lines at a predefined occasion. Said subscriber lines are encoded to comprise a unique network entity identity number information. Further, decoding means adapted to decode the network entity identity number information resulting from said test to gain said network entity identity number. Said network entity identity number is stored in a storage device on the network entity.

According to further one aspect of the present invention, an ID-programming tool is provided. Said ID-programming tool is used for assigning a unique network entity identity number to a network entity comprising a number of subscriber lines of the network. The tool comprises a number of line condition means, each line condition means is adapted to terminate a subscriber line and thereby simulate at least one line condition to the line it is connected to. By means of said subscriber line terminations at least storing a network entity identity number information to be assigned to a network entity when the tool is connected to said network entity during a predefined occasion.

Different embodiments of the method and subscriber client unit is provided in the enclosed dependent claims.

One advantage of the present invention is that it offers a simplified entity design as a special component, such as a dipswitch, is redundant. When designing an entity comprising a dipswitch, a number of design problem have to be considered:

the required space of the dipswitch and its wiring for connecting other components of the entity to the dipswitch;

how to offer required external access, as relatively easy accessible opening in the entity casing for operators is required. The gating will often require a more complex mechanic production process and increase the Unit cost;

Electro-Static Discharge (ESD) protection is needed when the operator access the interior of the entity. ESD protection requires both components and PCB-area. Especial the protection components will increase the Unit cost.

Without the dipswitch component, the above listed designing problems and considerations are avoided.

Therefore, further one advantage of the present invention is that it offers a decreased entity cost, as the dipswitch and other components add cost to the total cost of an entity.

Yet another advantage is that by an entity Software-update it is possible to introduce this invention on already developed and customer installed products.

Further one advantage the present invention is that the invention covers both POTS and xDSL Unit, and from a user point of view, the network-entity-ID-programming is carried out in the same way independent of node-type; in Plain Old Telephone Service (POTS) or different Digital Subscriber Line (xDSL) services.

BRIEF DESCRIPTION OF THE DRAWINGS

Different embodiments of the present invention will now be described and discussed in more detail hereinafter with reference to the following submitted drawings.

DETAILED DESCRIPTION

The present invention relates to a method for assigning a unique network entity identity number.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 5:
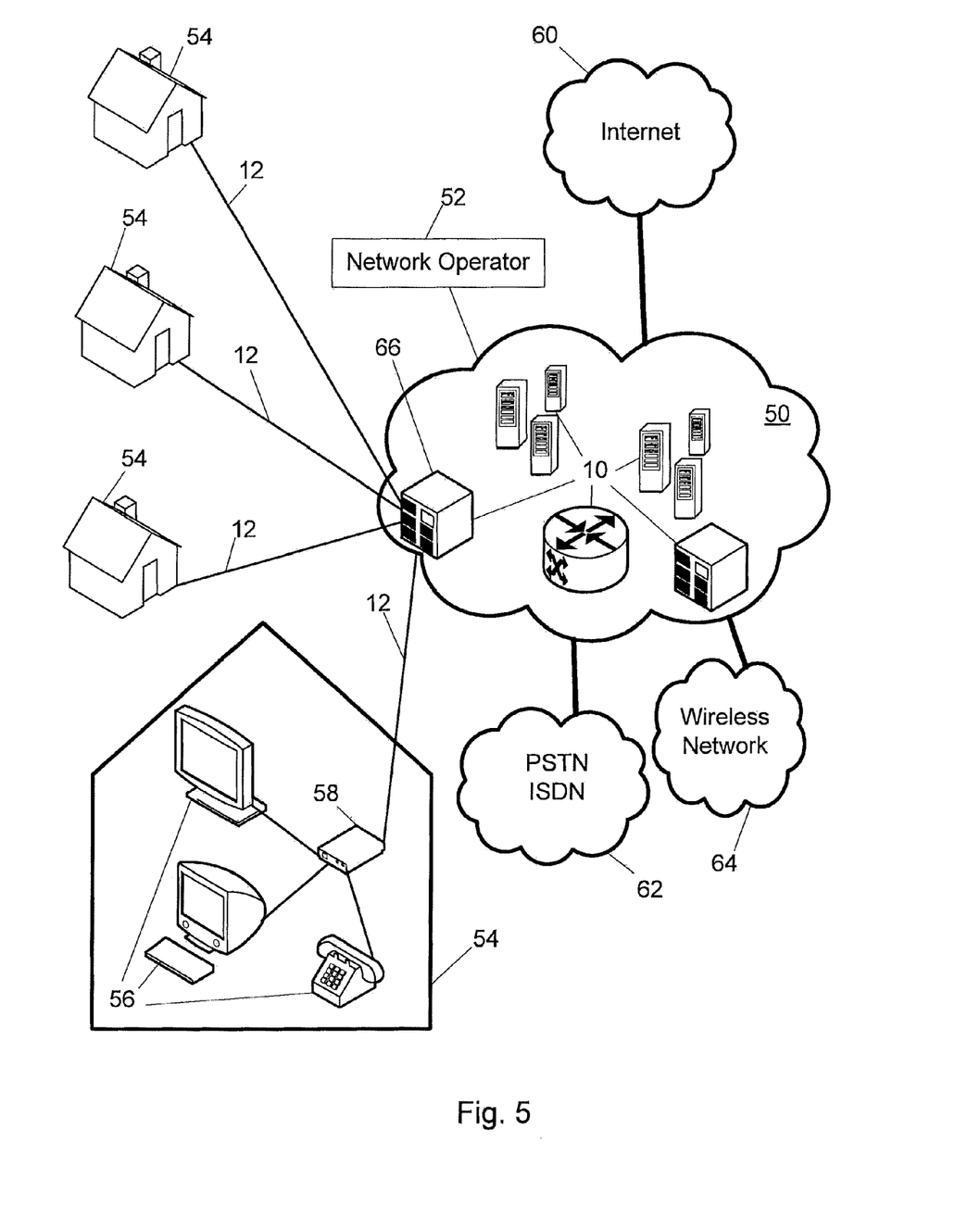
FIG. 5 is a block diagram of an exemplary network in which devices and methods described herein may be implemented.

Starting with FIG. 5, which is a block diagram illustrating an overview of a simplified network comprising parallel access systems 50. One system is a broadband network for fast data package communication, such as WLAN, Ethernet, Internet (IP), etc. The other system is a narrowband network for telephony communication, such as Public Switched Telephone Networks (PSTN), Integrated Services Digital Networks (ISDN), etc. Throughout this document, the terms broadband and narrowband are used. The term broadband is referring to bit rates equal to or more than 128 Kbytes/s, and the term narrowband is referring to bit rates less than 128 Kbytes/s, in accordance with different telecommunication standards. A subscriber has communication equipment 56, which is capable of transmitting and receiving both narrowband traffic and signalling and broadband traffic and signalling over a subscriber line 12. The subscriber's communication equipment 56 may be a telephone, a computer having a modem 58, a facsimile apparatus, TV-set, etc, which will transmit and receive voice and data information using any analogue or digital technique and standard. In this illustrated example, a number of subscriber lines 12 are connected to a local exchange 66 comprising a main distribution frame and a Multi Service Access Network (MSAN) element for combining a number of different access techniques.

Traditionally Network Operators 52 have provided narrowband and DSL broadband access to their customer's premises and residences 54 using two distinct systems—one for narrowband services, e.g. PSTN, POTS, ISDN, etc, and one for broadband services, e.g. DSL, data package communication, IP, etc. The network operator 52 uses a management system (not shown) to handle the systems—for managing and handling the broadband system, the routing/switching nodes containing among other things, the broadband line boards, and for managing and handling the narrowband system and the switching (exchange) nodes containing among other things, the narrowband line boards. However, Multi Service Access Network (MSAN) elements for combining a number of different access techniques in the same node, such as a local exchange close to the subscribers' premises 54. Different subscriber lines are gathered in a main distribution frame. The broadband traffic, such as digital data packet traffic, are handled by DSL equipment comprising DSL routers/data packet switches, such as Digital Subscriber Line Access Multiplexers (DSLAMs). The narrowband traffic, e.g. POTS and ISDN, is handled by exchange equipment, which is capable of directing said traffic to the PSTN/ISDN network.

Thus, a network or system 50 comprises a plurality of network entities 10, such as nodes, different electronic equipment, electronic component, elements and line interfaces for providing access to subscribers' communication equipment 56 and different communication networks and systems, such as POTS 62, ISDN 62, DSL, Internet 60, Fibre Optic systems, Wireless systems 64, etc. A unique network entity identity number may be assigned to each one of a number of said entities to facilitate identification, maintenance, and test operations by the network operator 52. Said identity number may be stored in the maintenance system of the network.

Figure 1:
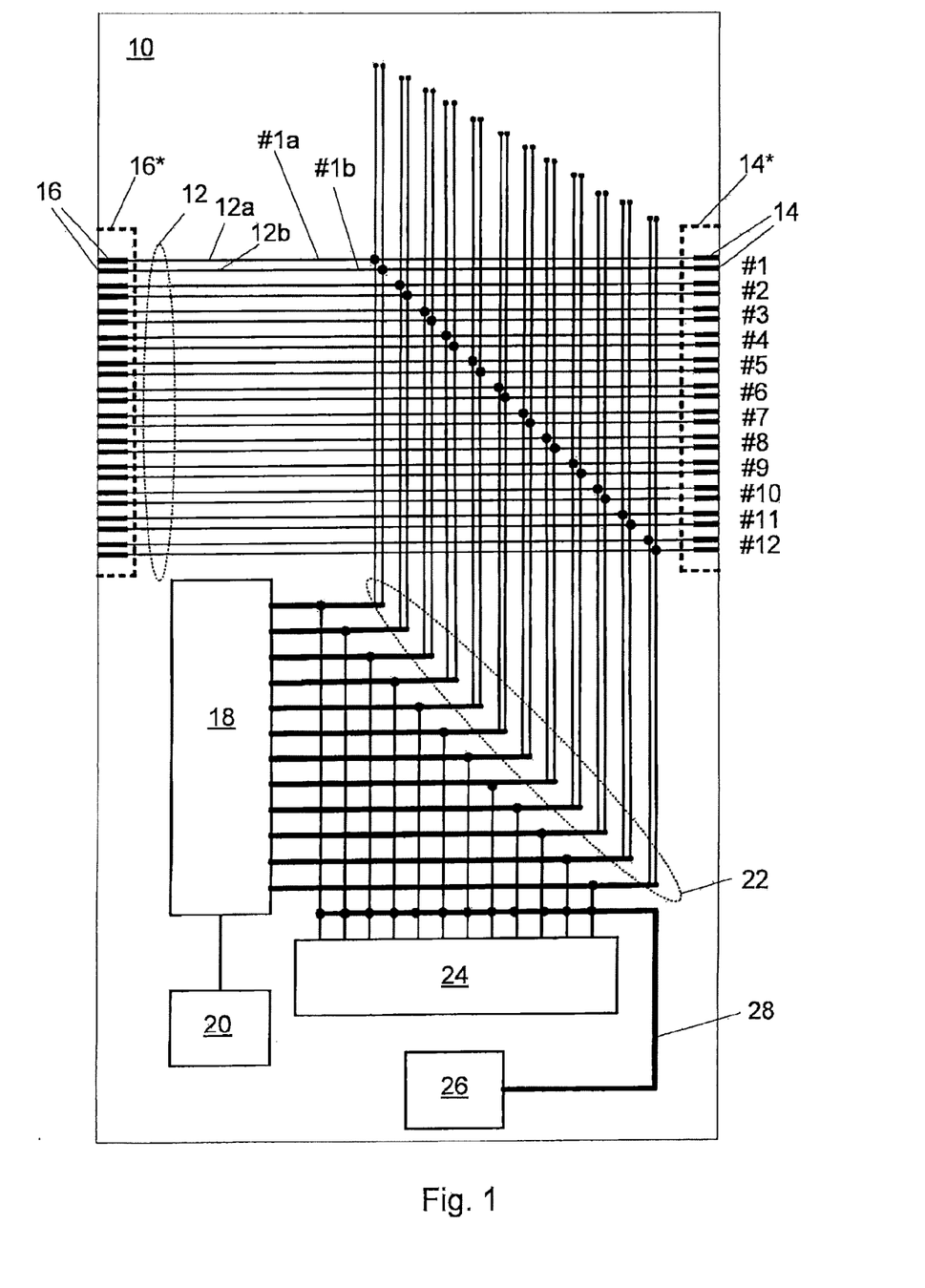
FIG. 1 is a block diagram schematically showing network entity, e.g. a subscriber line unit, according to prior art.

FIG. 1 is a block diagram schematically showing a network entity comprising a device for storing the network entity identity (ID) number according to prior art. The illustrated entity 10 is a Subscriber Line Unit, which is only a chosen and non-limiting example for illustrating a network entity.

A Subscriber Line Unit, even denoted Line Card or Digital Line Card, is a modular electronic circuit on a Printed Circuit Board (PCB), the electronic circuits on the card interfacing the telecommunication lines coming from the subscribers (such as copper wire or optical fibers) to the rest of the telecommunications access network. A line card commonly interfaces the twisted pair cable of a Plain Old Telephone System (POTS) local loop to the public switched telephone network (PSTN). Telephone line cards used in PSTN perform multiple tasks such as analog to digital and digital to analog conversion of voice, off-hook detection, ring supervision, line integrity tests, and other BORSCHT functions. In some telephone exchange designs the line cards generate ringing current and decode DTMF signals. A line card can terminate a line supporting voice POTS service, Integrated Services Digital Network (ISDN) service, Digital Subscriber Line (DSL) service, or proprietary ones. Some line cards are capable of terminating more than one type of service. Since an access network element is usually intended to interface many users (typically a few thousands) some exchanges have multiple line terminations per card. Similarly, it is common to have many line cards in the same network element of a network node.

In FIG. 1, a simplified subscriber line unit is illustrated and well-known components and functional blocks are omitted so as not to obscure the description with unnecessary detail.

The illustrated subscriber line unit comprises a number of subscriber line pairs 12, here copper lines, for interfacing the telecommunication lines coming from the subscribers and the twisted pair cable of a POTS local loop to the public switched telephone network (PSTN). In this example, a unit comprising 12 subscriber lines is presented. Each pair 12 comprises an a-wire 12*a* and b-wire 12*b*. Each pair 12 is numbered, #1, #2, #3, #4, #5, . . . , #10, #11, #12. The a-wire of the first subscriber line pair is therefore able to define as #1*a* and the b-wire of the first subscriber line pair is correspondingly defined as #1*b*. On each side of the card where the subscriber line pairs 12 has their ends, contacts 14 and 16 are provided on respective side. The contacts 14 on one side of the card are preferably gathered in one common connector device 14\* and the contacts 16 on the opposite side are correspondingly gathered in a second common connector device 16\*. The first subscriber line connector 14\* and the second subscriber line connector 16\* facilitate connection to said twisted pair cable and telecommunications lines, respectively, coming from the subscribers.

Further, the subscriber line unit comprises an entity processor 18 for supervising the line card functionality and for communicating with other entities of the network system. The subscriber line conditions (short circuit, open/terminated, x-talk, foreign voltage etc.), concerning a number of the subscriber lines in the entity, are possible to analyse by means of the built-in Single Ended Line (Loop) Testing (SELT) function at Digital Subscriber Line Internet Protocol-based (xDSLIP) entities in a Internet Protocol-based Digital Subscriber Line Access Multiplexer (IP-DSLAM) node and by using the built-in MEtallic Line (Loop) Testing (MELT) function at a POTS IP-entity in a IP-telephony node. To be able to run the SELT- and/or MELT-test for the subscriber lines 12, the entity processor 18 is connected to each subscriber line pair 12 via processor test lines 22, one for each wire of the line pairs 12.

The SELT and MELT functionalities are standardized and described in the standardization document ITU G.996.2 issued by the Telecommunication Standardization Sector (ITU-T) that coordinates standards for telecommunications on behalf of the International Telecommunication Union (ITU).

An Electro-Static Discharge (ESD) device 24 is placed on the line card. The ESD device 24 is connected via wiring to different components. It is needed for ESD protection when an operator access the interior of a casing or cabinet where the line card is connected to the network.

Generally, the entity processor 18 will receive instructions and data from a digital storage device 20, e.g. a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially-designed ASICs (Application Specific Integrated Circuits).

Further, the line unit 10 comprises a separate network Entity Identity Number (EIN) storage 26, which is connected to the entity processor 18 via processor test lines 22 (and via the ESD device 24 wiring). As explained above, the network Entity ID Number is unique and it is used for identifying the subscriber line unit in the system. It could be used in different situations such as fault detection when it is necessary to identify in which network entity a problem has been detected. Thus, said number is used by an operator for surveillance and maintenance purposes. The entity processor 18 is adapted to read the stored EIN. As an example, the EIN storage 26 may be a dipswitch. The dipswitch is a well-known device comprising a number of switches. As an example, an eight bit dipswitch may be used, which is containing eight single switches, one for each bit. Each single switch could be set manually in either of two positions for indicating off-position, even denoted "0" (zero), or on-position, denoted as "1" (one). The entity processor 18 is able to read an eight bit digital number.

According to prior-art, an operator service and/or installation personal sets manually the EIN storage 26. In case a dipswitch is used, each separate switch is set before powering up the entity. Therefore, the dipswitch has to be put on the entity on a place where it is easily visible and reachable for an installation and service person. When designing an entity comprising a dipswitch, a number of design problem have to be considered:

the required space of the dipswitch and its wiring for connecting other components of the entity to the dipswitch;
  how to offer required external access, as an relatively easily accessible opening in the entity casing for operator access is required. The gating of a casing and/or cabinet will often require a more complex mechanic production process and increase the Unit cost;
  Electro-Static Discharge (ESD) protection is needed when the operator access the interior of the entity for setting the ID-number. ESD protection requires both components and PCB-area. Especially the protection components will increase the Unit cost.

The present invention provides a solution to the problem to assign a unique network entity ID number.

According to the invention, the network entity by means of a processor 18 is configured to perform at least one test of the subscriber line conditions at a predefined occasion, e.g. powering-up of the entity 10. The invented method may also be performed at another predefined or predetermined occasion, e.g. software restart (software connected or related to the entity), by pushing a start button, etc.

At e.g. the powering up of the entity 10, the entity processor 18 tests a predetermined number of subscriber lines 12 provided in the entity. The predetermined or predefined number may involve all or a limited number of subscriber lines 12. The entity processor 18 tests said subscriber lines and registers their respective subscriber line condition. By means of the registered line conditions, the entity processor is adapted to decode the subscriber line conditions to be able to gain information whether or not to update its entity-ID-number during this power-up. If the decoded information indicates that an update of said number is to be performed, the processor decodes the information of a predefined number of subscriber lines to gain the network entity ID number.

Said all or a number of all subscriber lines have been line condition encoded before the power-up process is started., e.g. by means of a programming tool, even here denoted ID-programming tool, that has been temporary connected to the entity. The programming tool is configured to provide one of a number subscriber line condition options to each of the predefined number of said subscriber lines by using different subscriber line termination options that could be detected by performing one or more line condition tests. A line condition test provides a result or response for each tested subscriber line and the result is dependent of the line's termination. Each line condition provide a unique code to the entity processor which could decode and interpret said code as a subscriber line information, e.g. the binary values "1" and "0". Preferably, the subscriber lines has been grouped into different information groups, e.g. subscriber lines #1, #2, #11 and #12 constitute one information group and the remaining subscriber lines (e.g. lines #3-#10) are constituting one or more other information group(-s). The groups may therefore constitute binary values of different length. If two information groups are used, one information group may be dedicated to provide information, e.g. a certain binary value, that may be used for indicating that an network entity identity number should be performed. The second information group provides the assigned network entity identity number as a binary value.

Thus, some of the subscriber lines are predefined to contain update starting information and other subscriber lines to contain the network entity identity number.

Traditionally, depending on whether the network entity is an xDSL IP-unit or a POTS IP-unit, the entity processor performs the subscriber line test during power-up by means of the built-in SELT function at the xDSL IP-unit, e.g. in an IP-DSLAM node of the network, or by using the built-in MELT function at the POTS IP-unit, e.g. in an IP-telephony node of such a network. However, both the MELT and SELT functionalities may be built in and executed by the same network entity, such as the xDSL IP-unit or the POTS IP-unit.

Examples of different subscriber line conditions that may be used for coding the subscriber lines are short circuit, open/terminated, x-talk, foreign voltage, etc.

Some embodiments of the invention will now be described in more details with reference to FIGS. 2*a*, 2*b*, and 2*c*.

Figure 2A:
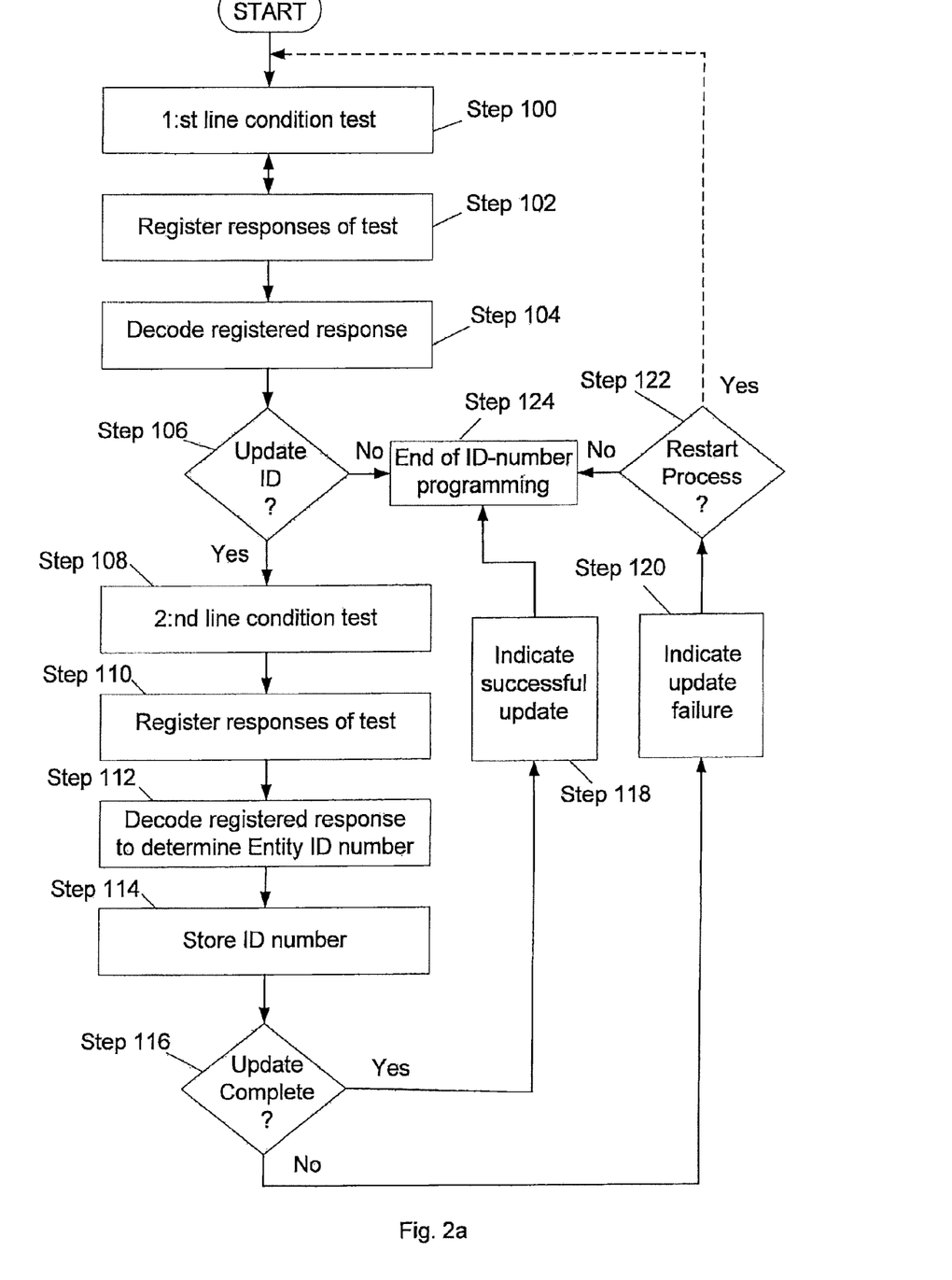
FIG. 2*a* is a flowchart illustrating an embodiment of the present invention.

FIG. 2*a* is a flowchart illustrating a first embodiment of the method according to the invention.

The method is performed at a predefined occasion, e.g. power-up of the entity, software restart (software connected or related to the entity), by pushing a start button, etc. In the first step, step 100, the entity processor performs a predetermined line condition test of a predetermined number of subscriber lines 12 provided in the entity. During said test, or in connection to said test, the processor registers the responses of said test, step 102. In the next step, step 104, the processor decodes the registered responses from each tested line on the entity. As described above in this description, the line condition encoded on the subscriber lines that are predefined to contain update starting information are decoded. The entity processor is further adapted to control whether or not to update the entity's network entity ID number due to the information received of the performed predetermined line condition test, step 106. The line condition may be compared to a pre-stored update starting condition, and if the two conditions are similar, denoted "yes" in the flowchart, the entity processor is adapted to continue by performing an ID updating process, wherein the processor performs a predetermined second line condition test, step 108. In said updating process, the entity processor registers the result of each tested subscriber line, step 110, and decodes the information of a predefined number of subscriber lines providing the network entity identity number to determine said ID number, step 112.

After having decoded the line conditions into an ID number, step 112, the entity processor is adapted to store the entity ID number in a suitable memory storage, preferably a non-volatile memory storage, in step 114.

If the condition for performing said updating process is negative, "NO", in step 106, the entity processor will finish the ID-programming process, step 124, and may continue with another suitable predetermined programmed process.

Thus, the updating process is not always successful. Therefore, a test step 116 is provided wherein it is tested whether the update process is successfully completed, or not. If a network entity ID number has been stored in the correct storage, the process is successfully completed, and the test question is responded with "yes", the entity processor is adapted to indicate to an operator (such as an installation person) that the programming process has been successfully completed, step 118. Such an indication may be performed by means of a Light-Emitting Diode (LED) display flashing a predetermined LED pattern. When a "success-indication" is received, the operator may confirm the indication and the entity processor will finish the ID-programming process, step 124. and may continue with another suitable predetermined programmed process. The operator then removes the programming tool and connects the subscriber lines to the contacts of the entity.

If the ID-number programming failed, and a entity ID number is not stored, the test question in step 116 is responded with "No". The entity processor may therefore generate a second LED flashing pattern for indicating the failure, step 120. The operator has then two options in step 122. Either to restart the whole process, "YES" by shutting off the power to the entity and power up again, wherein the processor will restart the process from step 100. The other option is to stop the ID-programming process by shutting down the power to the entity, try to detect the reason for the failure and correct the reason for the failure. If the problem is solved, the operator may restart the ID-programming by powering up the entity again from step 100.

Figure 2B:
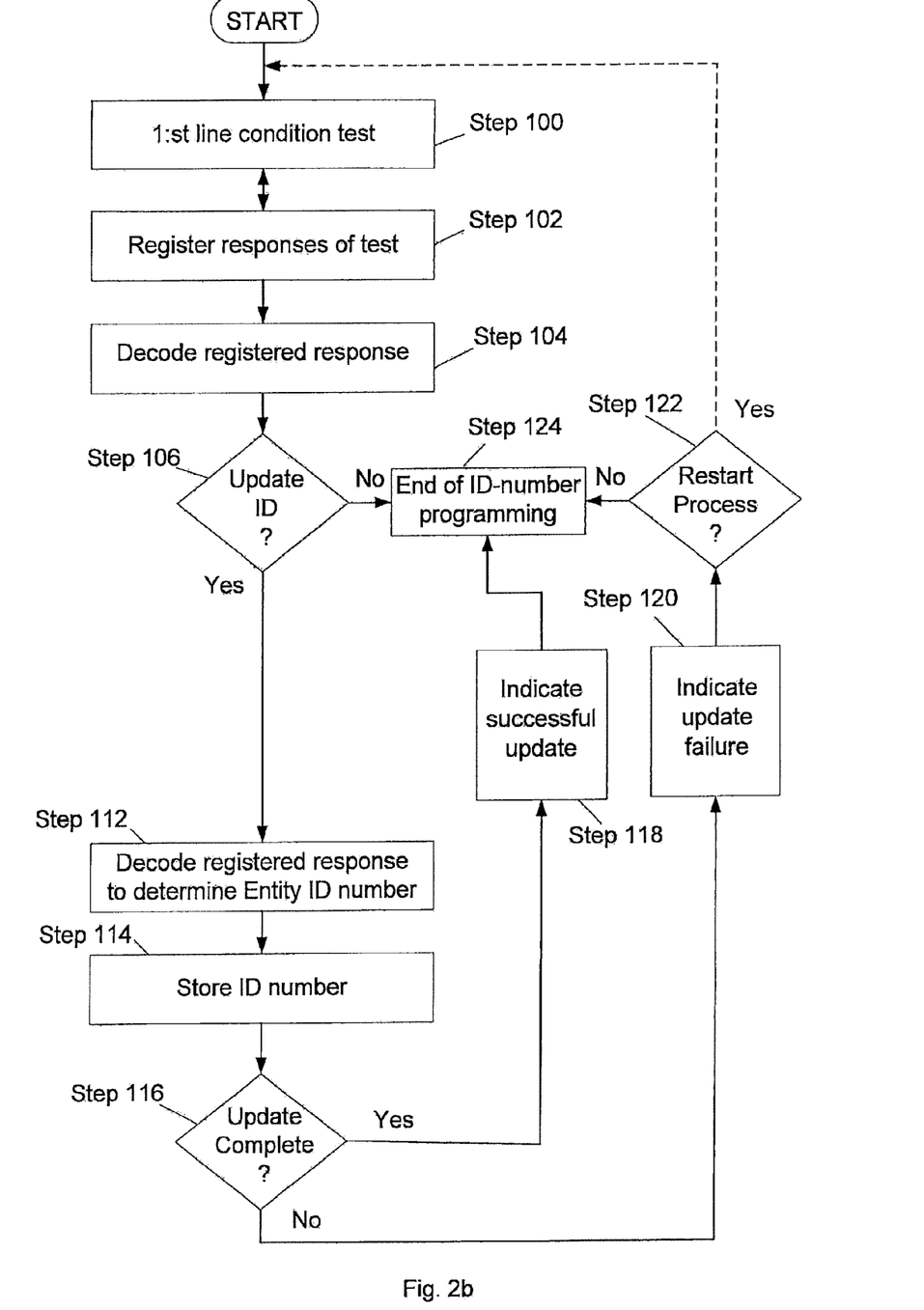
FIG. 2*b* is a flowchart illustrating another embodiment of the present invention.

FIG. 2*b* is a flowchart illustrating a second embodiment of the method according to the invention. This embodiment differs from the first embodiment in that only one line condition test is performed. Thus, a second line condition test is not performed as in step 108, and as step 110 is closely related to step 108, both steps 108 and 110 are left out in the second embodiment.

Also this embodiment of the method is performed at a predefined occasion, e.g. power-up of the entity, software restart (software connected or related to the entity), by pushing a start button, etc. In the first step, step 100, the entity processor performs a predetermined line condition test of all predetermined subscriber lines 12, both those subscriber lines that are predefined to contain update starting information and the other subscriber lines predefined to contain the network entity identity number, provided in/on the entity. During said line test, or in connection to said test, the processor registers the responses of said test, step 102. In the next step, step 104, the processor decodes the registered responses from each tested line on the entity to gain the update starting information.

The entity processor is further adapted to control whether or not to update the entity's network entity ID number due to the information received of the line condition test, step 106. The decoded line condition may be compared to a pre-stored update starting condition, and if the two conditions are similar, denoted "yes" in the flowchart, the entity processor is adapted to continue by decoding the information of the predefined number of subscriber lines providing the network entity identity number to determine said ID number, step 112.

After having decoded the line conditions into an ID number, step 112, the entity processor is adapted to store the entity ID number in a suitable memory storage, preferably a non-volatile memory storage, in step 114.

If the condition for performing said updating process is negative, "NO", in step 106, the entity processor will finish the ID-programming process, step 124, and may continue with another suitable predetermined programmed process.

Steps 116, 118, 120, 122, and 124 are performed as described in connection to embodiment 1 of the invention.

Figure 2C:
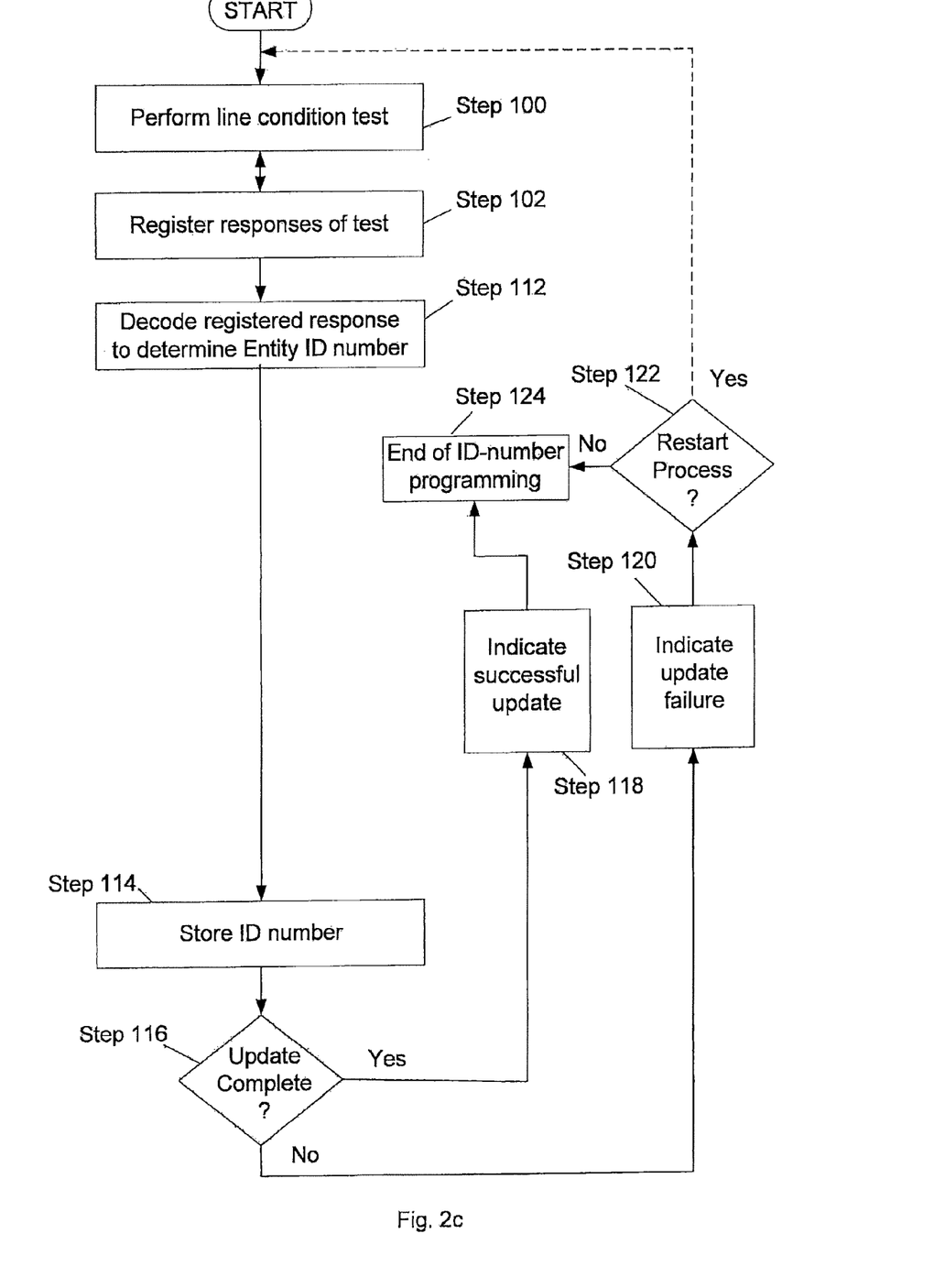
FIG. 2*c* is a flowchart illustrating another embodiment of the present invention.

FIG. 2c is a flowchart illustrating a third embodiment of the method according to the invention.

This embodiment differs from the above described second embodiment of the invented method in that step 106 is not performed.

The method according this third embodiment is also performed at a predefined occasion, e.g. power-up of the entity, software restart (software connected or related to the entity), by pushing a start button, etc. In the first step, step 100, the entity processor performs a predetermined line condition test of all predetermined subscriber lines 12, both those subscriber lines that are predefined to contain update starting information and the other subscriber lines predefined to contain the network entity identity number, provided in/on the entity. During said line test, or in connection to said test, the processor registers the responses of said test, step 102. The entity processor is further adapted to continue by decoding the information of the predefined number of subscriber lines providing the network entity identity number to determine said ID number, step 112.

After having decoded the line conditions into an ID number, step 112, the entity processor is adapted to store the entity ID number in a suitable memory storage, preferably a non-volatile memory storage, in step 114.

Steps 116, 118, 120, 122, and 124 are similar and performed as described in connection to embodiment 1 of the invention.

Figure 3:
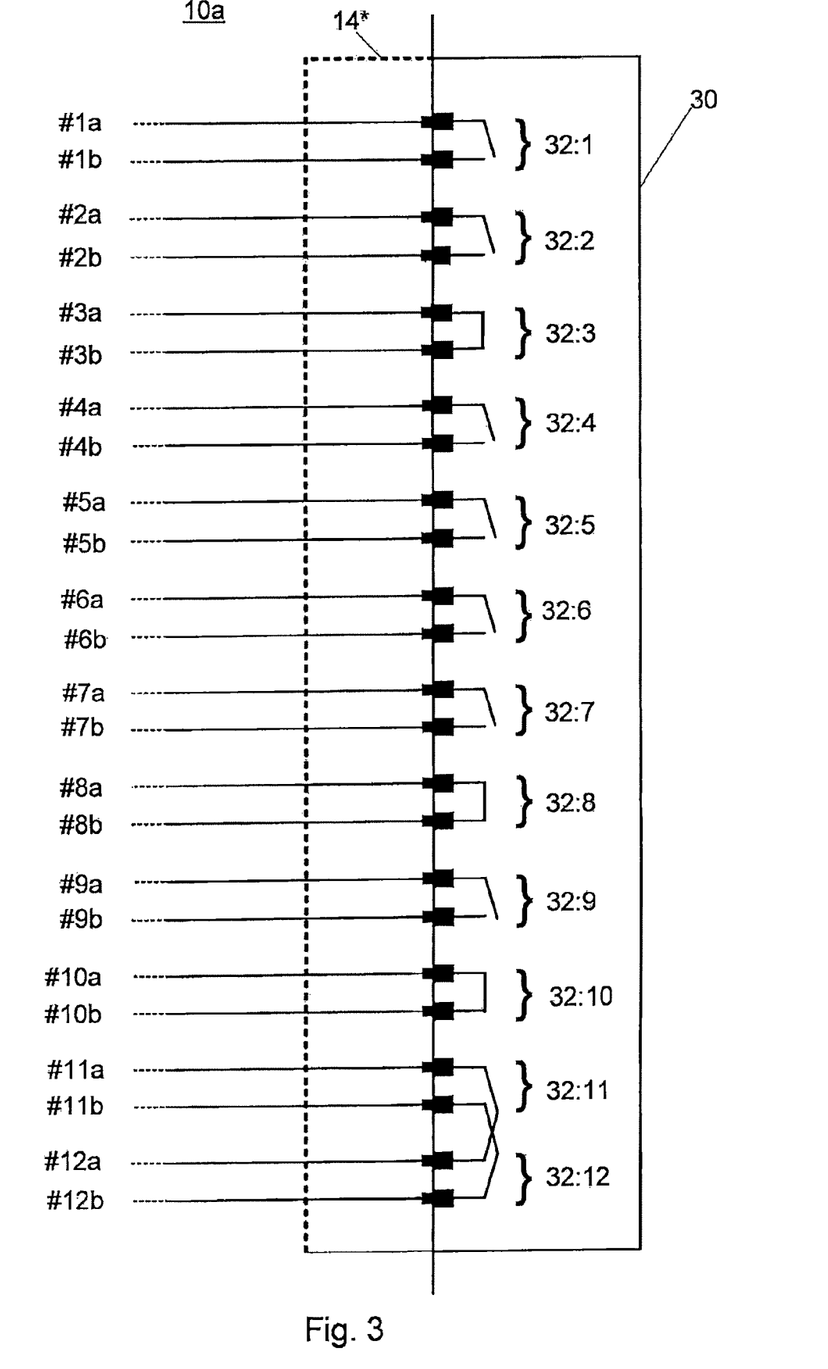
FIG. 3 is a block diagram illustrating schematically an embodiment of a programming tool.

FIG. 3 is illustrating an ID-programming tool 30 connected to a network entity 10. The programming tool 30 is provided with line condition means 32, which preferably is housed within a connector housing that is removably connectable to a corresponding subscriber line connector 14* on the entity 10. Each line condition means 32 is adapted to terminate a subscriber line and thereby simulate at least one line condition to the line it is connected to. Each means 32:1, 32:2, . . . also comprises suitable connections means to facilitate contact with a corresponding subscriber line and its wire pair #1a,#1b; #2a,#2b; #3a,#3b; . . . . The line condition means may be implemented in many different ways. In the illustrated example in FIG. 3, switches and shorting bars are used as line condition means. In said example, line condition means 32:1 to 32:10 are switches while line condition means 32:11 and 32:12 are shorting bars. With the switches, it is possible to temporary short circuit a wire pair (a, b) of a subscriber line, e.g. as shown for line condition means 32:3, wherein wires #3a and #3b are short circuited by a switch. However, when ID-programming another entity said means 32:3 is set to be open for implementing an open circuit. Thus, by means of the line condition means 32:1 to 32:10, it will be possible to individually select whether a subscriber line shall be open circuited or short circuited. Switches are well-known in prior art and the market offers a plurality of different switches. One selectable option is a dipswitch that is modified to comprise a suitable connection means. A line condition means 32, which are possible to set in one of at least two termination positions, are said to be an adjustable line condition means.

An operator, such as an installation and/or service staff person, will be able to set the individual adjustable connection means in one of the selectable position before said operator powers up the entity. Preferably, the line condition means 32 are set in correct positions before the tool 30 is connected to the entity and the entity is powered up.

If line conditions means 32 having two termination positions, e.g. open or closed, are used, it is possible to encode and decode one position as "0" and the other position as "1". As an example, by encoding a line condition means 32 as open circuited, the entity processor 18 may be adapted to decode this line condition as "0". Then, if the entity processor detects a line condition of a line condition means 32 as short circuited, the entity processor 18 is adapted to decode this line condition as "1".

Permanent line condition means having only one termination position are also possible to use in the ID-programming tool. Shorting bars is one possible type that may be used for permanent short circuiting the connections means connecting to a subscriber line or a number of subscriber lines. In the illustrated example, #11a and #12a are short circuited and #11b and #12b are short circuited as long as the ID-programming tool 30 is connected to the entity 10.

As already described, some of the subscriber lines are predefined to contain update starting information and other subscriber lines to contain the network entity identity number when the ID-number programming tool is connected to the network entity.

It is possible to select and use any combination of line condition means 32 in a programming tool for terminating any of the available subscriber lines that are predefined to contain update starting information. A plurality of different setting configurations are possible to use for said purpose. The illustrated example should not be regarded as a limitation of the scope of protection. However, it is only necessary to use one predefined setting arrangement or configuration of the line condition means 32 for representing the information that should be decoded by the entity processor to start the update of the network entity ID-number. By always using a certain line condition means set according to one permanent configuration representing starting update in a predetermined pattern, it is possible to use permanent line condition means that is not adjustable. Having ID-programming tools with only one permanent update starting configuration of subscriber lines, i.e. a determined group of subscriber lines that are dedicated to contain the update starting information, as a standard configuration are also favourable. With one standard programming tool for a network, all network entities with the same number of subscriber lines could be ID-number programmed using the same line condition test and the same test whether to start a ID number update, or not, i.e. step 106 in the flowcharts of FIGS. 2a and 2b.

With a physical symmetrical location of the subscribe lines at the Subscriber Line Connector, it is possible to detect if the programming tool is connected upside-down to a Unit Subscriber Line Connector. This upside-down situation will show the programming enabling result, which was expected at subscriber line #11 and #12, at subscriber line #1 and #2 instead. This fault situation can be brought to the operators notice by flashing a predefined LED-pattern.

In the illustrated example in FIG. 3, the line condition means 32:1, 32:2, 32:11 and 32:12 and corresponding subscriber lines #1, #2, #11 and #12 are predefined to contain update starting information. In this example, line condition means 32:1 and 32:2 are always open while subscriber line wires #11a and #12a are short circuited and #11b and #12b are short circuited by means of the shorting bars of line condition means 32:11 and 32:12. Each entity processor in the network has therefore to be modified to decode said configuration as a trigger for starting the process for updating the network entity ID-number. The other subscriber lines #3, #4, #5, #6, #7, #8, #9 and #10 together contain the network entity identity number when the ID-number programming tool is connected to the network entity for terminating said entities subscriber line contacts/connection means. The entity processor will be adapted to decode the ID number in the following table, Table 1:

TABLE 1

Decoding table

| Line condition means | Subscriber line | ID-programming digit |
|---|---|---|
| 32:3 | short circuit | 1 |
| 32:4 | open | 0 |
| 32:5 | open | 0 |
| 32:6 | open | 0 |
| 32:7 | open | 0 |
| 32:8 | short circuit | 1 |
| 32:9 | open | 0 |
| 32:10 | short circuit | 1 |

Thus, the network will get an eight digit long network entity ID-number: 10000101, which is the binary numeric value of 137.

A lot of different solutions and variants are possible, dependent on the actual design requirement concerning:
using open and short circuit as subscriber line termination at the ID-programming tool provide two logical values per subscriber line during ID-programming. If future programming need more complex information, other impedance values could be added, e.g. 100Ω, to generate a third or even more value results per subscriber line;
the number, denoted X, of subscriber lines in the entity;
the entity-ID-number range (named 0 to $2^Y-1$) supported by the entity, wherein Y is the number of subscriber lines used for representing the identity number.

In the above example, a subscriber line card with 12 subscriber lines (X=12) and a Unit-ID-number range requirement of 0 to 255 (Y=8) was used.

Some alternative embodiments of the present invention will hereafter described. The different embodiments are hereafter described with reference to FIG. 2a and FIG. 3. However, a person skilled in the art will easily modify said exemplified embodiments to be applicable in the embodiments described above and illustrated in FIGS. 2b and 2c.

Decoding Whether to Update Entity ID-Number or Not

The network-entities are pre-set to make a predefined line condition test. SELT-test or MELT-test may be used during power-up as line condition test. In some embodiments of the invention, the SELT-test is used as line condition test in xDSL IP-Units. In other embodiments of the present invention, the MELT-test is used by a POTS IP-Unit as line condition test. It is advisable to match the termination of the unit's subscriber line connector, which is achieved with the programming tool, and the line condition test used in the first part of the invented method.

xDSL IP-Unit Start-Up SELT-Test; ID-Number Update or Not:

The entity processor is pre-programmed to perform a line condition test at power up, as already described herein. In this embodiment of the invention, wherein the subscriber line connector of a xDSL IP-Unit is terminated as given in FIG. 3, it is suitable to have selected and to use a Cross Talk SELT-test as a predefined first line condition test between all subscriber lines in the unit. Said test is executed during power-up. The result of the SELT-test will show a great amount of cross talk between subscriber line #11 and #12, but a normal cross talk level between all other subscriber line relations in the unit. This unique subscriber line cross talk pattern during entity power-up SELT-test is defined as the correct update starting information. When the entity processor decodes and confirms this pattern as the correct update starting information (see steps 104 and 106 in FIG. 2a), the processor initiates that the entity ID-number update process should be performed. All other subscriber line cross talk patterns are defined as "no ID update process should be performed".

POTS IP-Unit Start-Up MELT-Test; ID-Number Update or Not.

The entity processor is pre-programmed to perform a line condition test at power up, as already described herein. When the subscriber line connector of a POTS IP-Unit is terminated as given in FIG. 3, it is suitable to select and use as a predefined line condition test a Foreign Voltage MELT-test between all subscriber lines in the unit. Said test will therefore be executed during power-up. Just before and during executing the Foreign Voltage MELT-test all subscriber lines are made active with normal polarity. The result of the Foreign Voltage MELT-test will show a foreign voltage at subscriber lines #11 and #12, the levels will be the subscriber line idle voltage ($U_{TipToGnd}$ and $U_{RingToGnd}$), but there will be none foreign voltage on all other subscriber lines in the Unit. When the entity processor decodes and confirms this pattern as the correct update starting information (see steps 104 and 106 in FIG. 2), the processor initiates that the entity ID-number update process should be performed. All other subscriber line Foreign Voltage patterns are defined as "no ID update process should be performed".

Decoding/Decrypting Concerning Update ID-Number for the Unit

The second part of the invented method, the update ID-number process, is hereafter described with reference to FIG. 2a and FIG. 3. The requirement is that the first part of the invented method, steps 100-106 in FIG. 2a, confirms that the update ID-number process comprising steps 108-114, should be executed. A second line condition test is used in the second part of the invented method. As mentioned above, the SELT-test is preferably used by a xDSL IP-Unit, and the MELT-test is preferably used by a POTS IP-Unit.

xDSL IP-Unit Power-Up SELT-Test; Entity ID-Number Detection and Update:

At this stage, the entity processor is pre-programmed to perform a second line condition test at power up, as described with reference to FIG. 2a and steps 108-114. When the subscriber line connector of a xDSL IP-Unit is terminated as given in FIG. 3, it is suitable to have selected and to use as a predefined second line condition test a 4-wire echo response measurement on each of subscriber lines #3 to #10. The level of the echo response for each subscriber line shows if the subscriber line is Short Circuited or Open and thus the echo SELT-result for the subscriber lines #3 to #10 will contain the wanted network entity ID-number defined by the ID-programming tool, e.g. as illustrated in FIG. 3. The network entity ID-number is stored in non-volatile memory, as in step 114.

POTS IP-Unit Power-Up MELT-Test; Entity ID-Number Detection and Update:

At this stage, the entity processor is pre-programmed to perform a second line condition test at power up, as described with reference to FIG. 2a and steps 108-114. When the subscriber line connector of a POTS IP-Unit is terminated as given in FIG. 3, it is suitable to have selected and to use as a predefined second line condition test a three-terminal resistive measurement ($R_{a\text{-wire to ground}}$, $R_{b\text{-wire to ground}}$ and $R_{a\text{-wire to b-wire}}$) on each of the subscriber lines #1 to #10, then this resistive MELT-result will contain the wanted Unit-network-ID-number defined by the programming tool, e.g. as illustrated in FIG. 3. The resistance values $R_{a\text{-wire to b-wire}}$ (0 or Inf. Ω) concerning subscriber lines #3 to #10 gives the network-ID-number. The network entity ID-number is stored in non-volatile memory, as in step 114. As an option, the resistance values $R_{a\text{-wire to ground}}$ and $R_{b\text{-wire to ground}}$ concerning line #1 to #10 and the resistance values $R_{a\text{-wire to b-wire}}$ concerning line #1 to #2 could be used as a second level security to be sure that network entity ID-update is wanted and everything looks right and reliable concerning the set-up to detect the network entity ID-number.

Figure 4:
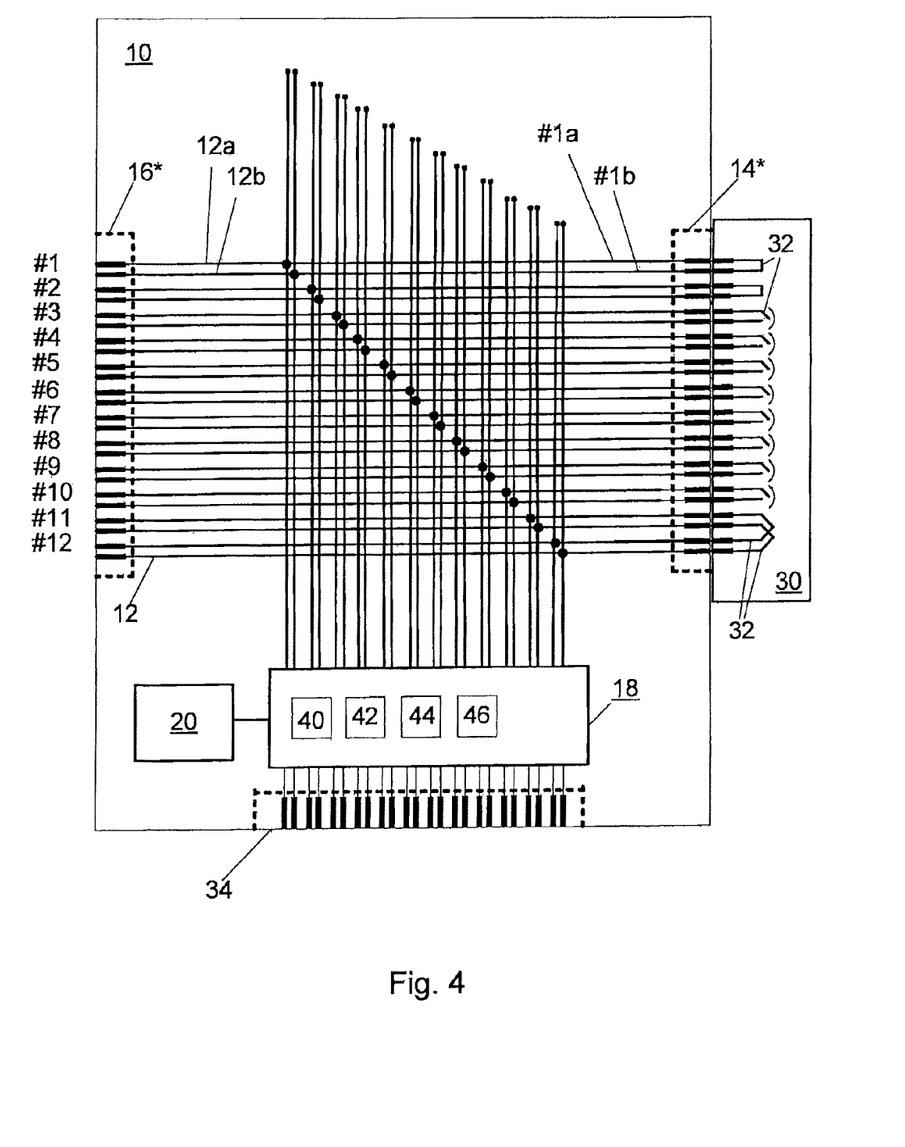
FIG. 4 is a schematic block diagram illustrating a network unit according to the invention to which a programming tool temporarily is connected during power up for enabling the ID-number programming of the unit in accordance with the present invention.

FIG. 4 is schematically illustrating a network entity, e.g. a subscriber line unit, to which a programming tool temporarily is connected during power up for enabling the ID-number programming of the unit in accordance with the present invention.

FIG. 1 is a block diagram schematically showing a equivalent network entity according to prior art. Besides the ID-number programming according to the present invention, both subscriber line units are providing the same functionality to the network and its operators. The prior art entity 10 comprises an ESP device 24 and wirings belonging to said device 24, and a separate network Entity Identity Number (EIN) storage 26 e.g. a dipswitch. Said devices are possible to exclude on/in a corresponding entity as a consequence of the present invention. The invention therefore provides the possibility to reduce the size of the network entity and the cost for producing such an entity.

Other vice, corresponding component and elements in FIGS. 1 and 4, respectively, are designated the same reference numbers.

The embodiment in FIG. 4 is provided with plug-in contacts 34 for power supply and for making communication and control signalling with other node units and entities in the network, or the network operator, service person, installation personal, etc. possible.

According to the illustrated embodiment of the invention in FIG. 4, the entity data processor unit 18 is adapted to operate according to any of the embodiments of the invented method as discussed above. At the powering up of the entity 10, the entity processor 18 are adapted to test a all or a predetermined number of subscriber lines 12 provided in the entity. By means of the registered line conditions, the entity processor is adapted to first decode the subscriber line conditions of the subscriber lines that are predefined to contain update starting information to be able to gain information whether or not to update its network entity ID-number during this power-up. And if the decoded information indicates that an update of said number is to be performed, the processor is adapted to decode the information of the predefined number of subscriber lines that contain the network entity identity number to gain and store the network entity ID number in a suitable memory storage.

The network entity 10 adapted for assignment of a unique network entity identity number is comprising an entity data processor (18) and a number of subscriber lines 12 of the network. To be able to perform the ID-numbering assignment method, network entity 10 comprises means 40 for performing at least one predetermined line condition test on at least a number of said subscriber lines 12 at a predefined occasion. A predefined a predetermined occasion may be e.g. power-up of the entity, software restart (software connected or related to the entity), by pushing a start button, etc. Said line condition test may be selected from any of the SELT and MELT tests built in the entity processor 18.

Said subscriber lines 12 have been encoded to comprise a unique network entity identity number information by means of e.g. a ID-programming tool 30 as illustrated. The network entity 10 is also comprising a decoding means 42 adapted to decode the network entity identity number information resulting from said performed test to gain said network entity identity number. The decoding process is preferably performed by an adapted data processor unit 18. Further, the processor 18 is adapted to receive and store said network entity identity number in a storage device 20 on the network entity.

In one embodiment, the entity data processor (18) is further provided with controlling means 44 for controlling whether or not to update the entity's network entity ID number due to update starting information received of a performed predetermined line condition test. To get said update starting information, it is provided means 46 adapted to register the responses of said line condition test, and means adapted to decode said responses to gain said update starting information.

Said means may advantageously be implemented in one or more computer programs that are executable on a programmable system including at least one programmable processor, such as the entity data processor unit 18 coupled to receive data and instructions from, and to transmit data and instructions to, a data storage system 20, at least one input device, and at least one output device. Each computer program may be implemented in a high-level procedural or object-oriented programming language, or in assembly or machine language if desired; and in any case, the language may be a compiled or interpreted language.

The present invention provides a number of advantages. An advantage is that this invention reduces the direct component total cost at an expected high volume products such as EDN624 (EDA1200 xDSL Unit) with app. 0.68€ each. The total TK reduction includes both electrical cost savings (fewer components) and savings due to simpler mechanics.

A second advantage is, that by a Unit SW-update it is possible to introduce this invention on already developed and customer installed products like e.g. END524 (POTS IP-Unit) and EDN612 (VDSL2 IP-Unit); both EDA1200 products.

A third advantage is, that the invention covers both POTS and xDSL Unit, and from a user point of view, the network-Unit-ID-programming is carried out in the same way independent of node-type, POTS or xDSL.

A number of embodiments of the present invention have been described. It will be understood that various modifications may be made without departing from the scope of the invention. Therefore, other implementations are within the scope of the following claims defining the invention.

The invention claimed is:

1. A method for assigning a unique network entity identity number to a network entity comprising a number of subscriber lines of a network, wherein the network entity is adapted to perform at least one line condition test on said subscriber lines at a predefined occasion, the method comprising:
performing a predetermined line condition test on at least a number of said subscriber lines being encoded to comprise an unique network entity identity number information;
decoding said network entity identity number information resulting from said test to gain said network entity identity number; and
storing said network entity identity number in a storage device on the network entity.

2. The method according to claim 1, further comprising the step of:
controlling whether or not to update the entity's network entity ID number due to update starting information received of the performed predetermined line condition test.

3. The method according to claim 1, further comprising the steps of:
performing a predetermined first line condition test on at least a number of said subscriber lines, which has been encoded to comprise update starting information;
registering the responses of said first line condition test; and
decoding said responses to gain said update starting information.

4. The method according to claim 3, wherein said predetermined first line condition test and said predetermined line condition test are equivalent or similar line condition tests.

5. The method according to claim 4, wherein said predetermined first line condition test is a Single Ended Line Test (SELT) and said predetermined line condition test are equivalent or similar line condition tests.

6. The method according to claim 4, wherein said predetermined first line condition test is a Metallic Line Test (MELT) and said predetermined line condition test are equivalent or similar line condition tests.

7. The method according to claim 3, wherein said predetermined first line condition test and said predetermined line condition test are different line condition tests.

8. The method according to claim 7, wherein said predetermined first line condition test is a Single Ended Line Test (SELT) and said predetermined line condition test is another Single Ended Line Test (SELT).

9. The method according to claim 7, wherein said predetermined first line condition test is a Metallic Line Test (MELT) and said predetermined line condition test is another Metallic Line Test (MELT).

10. A network entity adapted for assignment of a unique network entity identity number, said entity comprising an entity data processor and a number of subscriber lines of a network, wherein the network entity comprises a line condition tester for performing at least one predetermined line condition test on at least a number of said subscriber lines at a predefined occasion, said subscriber lines having been encoded to comprise a unique network entity identity number information, a decoder adapted to decode the network entity identity number information resulting from said test to gain said network entity identity number, and a storage device for receiving and storing said assigned network entity identity number of the network entity.

11. The network entity according to claim 10, wherein the entity data processor further comprises a controller for controlling whether or not to update the entity's network entity ID number due to update starting information received of the performed predetermined line condition test.

12. The network entity according to claim 10, wherein the entity data processor is adapted to register the responses of said first line condition test and to decode said responses to gain said update starting information.

13. An ID-programming tool for assigning a unique network entity identity number to a network entity comprising a number of subscriber lines of a network, is wherein the ID-programming tool comprises a number of subscriber line terminators each being adapted to terminate a subscriber line and thereby simulate at least one line condition to the line to which it is connected, and by means of said subscriber line terminations at least storing a network entity identity number information to be assigned to a network entity when the tool is connected to said network entity during a predefined occasion.

14. The ID-programming tool according to claim 13, wherein said subscriber line terminations also are storing update starting information for initiating the assignment of said network entity identity number information to said network identity.

15. The ID-programming tool according to claim 13, wherein a number of the subscriber line terminators are operable to be set in at least two termination positions.

16. The ID-programming tool according to claim 15, wherein the subscriber line terminators are operable to be set in at least two termination positions are switch devices.

17. The ID-programming tool according to claim 15, wherein at least one of the subscriber line terminators has one permanent line condition position.

18. The ID-programming tool according claim 15, wherein said subscriber line terminators are housed within a connector housing, which is removably connectable to a corresponding subscriber line connector.

* * * * *

UNITED STATES PATENT AND TRADEMARK OFFICE
CERTIFICATE OF CORRECTION

PATENT NO. : 8,532,264 B2  
APPLICATION NO. : 13/511239  
DATED : September 10, 2013  
INVENTOR(S) : Kristensen Page 1 of 1

It is certified that error appears in the above-identified patent and that said Letters Patent is hereby corrected as shown below:

In the Specifications

In Column 4, Lines 2-3, delete "implemented;" and insert -- implemented. --, therefor.

In Column 8, Line 49, delete "124. and" and insert -- 124 and --, therefor.

In Column 11, Line 14, delete "subscribe" and insert -- subscriber --, therefor.

In Column 13, Line 64, delete "ESP" and insert -- ESD --, therefor.

In Column 14, Line 16, delete "test a all" and insert -- test all --, therefor.

In Column 14, Line 50, delete "storage device 20" and insert -- storage system 20 --, therefor.

In the Claims

In Column 16, Line 37, in Claim 13, delete "is wherein" and insert -- wherein --, therefor.

In Column 16, Line 48, in Claim 14, delete "also are" and insert -- are also --, therefor.

In Column 16, Line 60, in Claim 18, delete "according claim" and insert -- according to claim --, therefor.

Signed and Sealed this  
Twenty-fifth Day of March, 2014

Michelle K. Lee  
*Deputy Director of the United States Patent and Trademark Office*